United States Patent Office 3,785,992
Patented Jan. 15, 1974

3,785,992
PROCESS FOR PRODUCING UNTWINNED SINGLE
CRYSTALS OF LaAlO₃
Homer Fay, Somers, N.Y., and Charles D. Brandle, Jr., Somerville, N.J., assignors to Union Carbide Corporation
No Drawing. Continuation of application Ser. No. 836,199, June 11, 1969, which is a continuation of application Ser. No. 558,582, June 20, 1966, both now abandoned. This application Jan. 11, 1972, Ser. No. 217,032
Int. Cl. C09k 1/68; B01j 17/18; C01r 7/02
U.S. Cl. 252—301.4 R                6 Claims

ABSTRACT OF THE DISCLOSURE

Lanthanum aluminate crystals grown as optically translucent twinned crystals are detwinned to produce optically transparent crystals suitable for use as laser hosts. The detwinning is produced by application of moderate mechanical stress to the twinned crystal along a [111] direction until the crystal exhibits optical transparency.

This application is a continuation of application Ser. No. 836,199 filed June 11, 1969, and now abandoned, which is in turn a continuation of Ser. No. 558,582, filed June 20, 1966, and now abandoned.

The invention herein described was made in the course of or under a contract with the Office of Naval Research and the Government has been granted a royalty-free license to practice and have practiced the invention for governmental purposes.

This invention relates in general to novel inorganic crystals of the type $ABO_3$ having a space group of the Pm3m at elevated temperatures and having a high-low phase transition. More particularly the invention relates to a novel crystal of $LaAlO_3$ having a single homogeneous domain.

Crystalline materials of the type $ABO_3$ having a centro-symmetric site for dopant ions are sought after as laser hosts in which enhanced fluorescent lifetimes may be realized. These would be attractive wherever high-energy laser pulses are desired, for a longer lifetime means that a greater population inversion can be attained before lasing ensues. The greatest lifetime enhancement thus far reported is that for $Cr^{+3}$ fluorescence in $LaAlO_3$, given as 25–37 milliseconds at room temperature and 64 milliseconds at 77° K.; this is an order-of-magnitude greater than the $Cr^{+3}$ fluorescence in ruby (3 ms. at 300° K. and 4.3 ms. at 77° K.) where the dopant ion is located at a distorted octahedral site. $Nd^{+3}$ fluorescence in $LaAlO_3$ is also enhanced about 2 times over that in other hosts.

Other examples of lifetime enhancement have been sought by various investigators studying various host compositions with various dopants, including di- and tetra-valent cations. Some of these studies are incomplete, but nonetheless nothing approaching the spectacular results realized with $LaAlO_3$ have been indicated.

Up to the present time progress in the manufacture of $LaAlO_3$ as a laser crystal has been impeded by two types of defects in the crystals available; namely, color centers and twinning. A color center problem is not unusual in the early stages of crystal growth programs. The solution to the problem is frequently found in careful attention to the purity of starting materials and the chemistry of the ambient growth atmosphere, but twinning is a more serious defect. Each system in which it occurs requires individual treatment. Twinning in $LaAlO_3$ results on cooling the crystal through the cubic-to-rhombohedral phase transition at a temperature variously reported in the past to be in the range 350–490° C. Such twinning causes the crystal to be optically translucent rather than transparent.

It is, therefore, the principal object of the present invention to provide a crystal of the type $ABO_3$ wherein the crystal can be made free of twinning or wherein there is at least a substantial portion of the crystal having a single homogeneous domain.

It is a more particular object to provide a large crystal of $LaAlO_3$, either per se or containing dopant ions such as $Cr^{3+}$, $Nd^{3+}$ or $Eu^{3+}$, suitable for use as a laser host that is, an optically transparent single crystal having a single homogeneous domain at 25° C.

It is a further object to provide a novel process for preparing the aforesaid untwinned $LaAlO_3$ crystal.

We have surprisingly found that crystals of the $ABO_3$ type and particularly $LaAlO_3$ when grown by the Czochralski technique, i.e. pulling from the melt, although exhibiting twinning upon being cooled to ambient room temperature, can be detwinned and rendered optically transparent by the application of moderate shear forces exerted along one of the [111] directions.

Compounds of the formula-type $ABO_3$ commonly crystallize in the perovskite crystal structure. The ideal perovskite structure is cubic and has the symmetry of space group Pm3m. There are many examples of slight distortions of this structure and these are frequently associated with unusual electrical properties such as ferro-electricity and antiferroelectricity. In the ideal perovskite structure, the oxygen ions and the A-ions together are in cubic close packing, while the B-ions occupy one-fourth of the octahedral voids. Thus the ionic radius of the A-ion should be comparable to that of oxygen or 1.40 A., while the radius of the B-ion should be about 0.58 A. In $LaAlO_3$, the ionic radius of $La^{3+}$ (1.15 A.) is somewhat too small for an ideal fit and the room-temperature structure is slightly distorted. At room temperature $LaAlO_3$ belongs to space group $R\bar{3}m$ and the rhombohedral angle is 60°06′, as opposed to 60°00′ for the cubic structure. At higher temperatures the distortion becomes even less and crystals of $LaAlO_3$ become isotropic in the vicinity of 500° C. The $La^{3+}$ ion is one of the largest trivalent ions and the other rare earth aluminates are more severely distorted due to the "lanthanide contraction." Thus $LaAlO_3$ is the most nearly cubic (at room temperature) of the known $ABO_3$-compounds, wherein both cations are trivalent.

The distortion in $LaAlO_3$ is very slight but it is still sufficient to produce twinning, and thus optical in homogenities, in all synthetic crystals of this compound. This distortion resulting from the high-low transformation in $LaAlO_3$ is of the displacine type. The structure $R\bar{3}m$ is a derivative of the Pm3m structure. There is a doubling of the unit cell and the $La^{3+}$ ions are alternately displaced slightly along one of the body diagonals [111] of the original cube. The long body diagonal of the rhombohedral becomes the optic axis. It is apparent that any of the four body diagonals of the original cubic cell is equally likely to become the optic axis and it is this ambiguity that causes the twinning. In various regions, what was initially a homogeneous single crystal, the optic axis is oriented in each of four different directions.

According to the theory of derivative crystal structures, the twins will be related by a symmetry element that has been suppressed in the transformation from the high to the low form. In $LaAlO_3$, the transition from Pm3m symmetry to $R\bar{3}m$ suppresses the mirror planes (m) normal to the cube axis. These planes can recur as twin boundaries. Similarly, one half of the mirror planes normal to the [110] directions in the original cube are destroyed by the transformation, and these planes are also possible twin boundaries. These are both examples of transformation twinning, wherein the original cubic network is only mildly distorted. In both cases the twin boundary plane bisects the angle between the optic axes of the two twins, and therefore causes an optical defect in the crystal. The twin boundaries of the [100] and [110] transformation twins are the bisectors respectively of adjacent and non-adjacent body diagonals of the original cube. We have found that $LaAlO_3$ twins on [100] planes based on testing as described hereinafter.

The preparation of large $LaAlO_3$ crystals by the melt-pulling process is readily accomplished using well known apparatus wherein an R-F induction generator is employed to supply the energy to form the melt. The melt is formed by conduction heating, coupling being made to an iridium crucible. A rotatable seed rod and means for raising said rod at a predetermined constant rate from the surface of the melt in the crucible is provided to constantly withdraw or "pull" the newly formed crystal from the melt, and the entire apparatus is provided with a covering means to maintain an atmosphere of appropriate atmosphere surrounding the crucible and growing crystal.

When growing pure $LaAlO_3$ a pure nitrogen atmosphere is used. This is also true for neodymium and europium doped $LaAlO_3$. In growing a chromium doped crystal an $Ar-N_2-O_2$ gas mixture is used. Chromium apparently enhances the solubility of nitrogen in $LaAlO_3$ thus causing bubble formation. A typical gas mixture when doping with Cr is 16 c.f.h. Ar, 3 c.f.h. $N_2$, and 1.1 c.f.h. $Ar/05\%$ $O_2$.

A high purity $LaAlO_3$ crystal is used as the seed for beginning crystal growth. The orientation of the seed can be [112] or [111]. The [111] orientation is preferred for easier detwinning. These orientations can be used for both pure and doped $LaAlO_3$. Pull rates have varied from about .05 to 1½ inches/hr. For a ⅝ inch diameter crystal 0.5"/hr. is about the upper limit. Thus in general the larger the diameter of the crystal, the slower the growth rate. The seed rod is rotated preferably at about 20 r.p.m. but various rotation rates have been used—without any apparent criticality. As the rod rotates, there should be a minimum of eccentricity, but zero eccentricity is seldom achieved. During growth, there will usually be a temperature differential of about 10° C. between the side of the crystal and the wall of the crucible (about 2115–2125° C.). The smaller the temperature gradient the better the process becomes from an economical viewpoint.

Typical examples of charges used to form the melt are:

Pure $LaAlO_3$ $La_2O_3$ ---------------------------------- 48.54 gm.
$Al_2O_3$ ---------------------------------- 15.19 gm.

Nd:$LaAlO_3$ $La_2O_2$ ------------------------------- 52.31 gm.
$Nd_2O_3$ ---------------------------- 0.536 gm. (0.781%).
$Al_2O_3$ -------------------------------- 16.54 gm.

$LaAlO_3$:Cr $LaAlO_3$ --------------------------------- 33.6 gm.
$La_2O_3$ ---------------------------------- 32.2 gm.
$Al_2O_3$ ---------------------------------- 10.06 gm.
$Cr_2O_3$ ---------------------------------- 0.0389 gm.

$LaAlO_3$:Eu $La_2O_3$ ---------------------------------- 45.4 gm.
$Al_2O_3$ ---------------------------------- 14.6 gm.
$Eu_2O_3$ ---------------------------------- 0.15 (.0025%).

Non-rare earth impurities, i.e. calcium, magnesium and silicon in amounts of from about 100 to 200 parts per million in the $La_2O_3$ starting material cause a dark yellow-brown discoloration in the melt-grown crystal. When non-rare earth impurities in the $La_2O_3$ starting material are kept below about 60 parts per million, the resulting crystal product is clear and colorous.

In general, the weight percentages of the charge constituents is determined by the molecular weight of $La_2O_3$ and $Al_2O_3$-growth being carried out at or near stoichiometry. This can be expressed as:

$$\text{Wt. of } La_2O_3 \times \frac{(\text{Mol. wt. } Al_2O_3)}{(\text{Mol. wt. } La_2O_3)} = \text{Wt. of } Al_2O_3$$

the ratio of the molecular weights being 0.313. When a rare earth dopant is added, the expression becomes (Dopant+$La_2O_3$) $0.313 = Al_2O_3$. The amount of dopant to be added is a function of the dopants ability to fluoresce. Cr doped melts are usually 0.05 wt. percent $Cr_2O_3$.

After the crystal has grown to a desired size, it is raised about ¼" above the melt for cool down. As the temperature is lowered, the crystal is raised. For a ½" diameter crystal the cool down period lasts about ½ hour; a larger crystal requires a somewhat longer period. This relatively slow cool down prevents thermal shock. When the crystal is cooled down sufficiently for handling, it is packed in $La_2O_3$ and annealed for about 16 hours to remove any color centers and to relieve internal stresses which may have been built up. This is done in a reducing atmosphere of 15% $H_2$ and 85% $N_2$ at a temperature of 1700–1750° C.

After annealing, the crystal is fabricated into a cylindrical rod or some other suitable shape. With the seed for crystal growth has a [111] orientation, the rod axis will be the [111]. When the seed has been of some other orientation, the [111] orientation is located and the crystal is fabricated such that there will be a pair of surfaces perpendicular to the [111] axis. These two surfaces or rod ends are ground flat and parallel such that a mechanical stress can be applied to the surfaces for detwinning.

In order to determine which of the two twin types [100] or [110] actually ouccur in Czochralski, i.e. melt pulled $LaAlO_3$ crystals, wafers of known orientation were cut from a crystal prepared as described above for optical examination. A flat surface of arbitrary orientation was first cut on the crystal boule. The orientation of this face was then determined from Laue back-reflection photographs. The crystal was then mounted and sawed to produce the desired cut or slab, and finally these cut faces were checked by taking new Laue photographs. In this manner slabs were obtained that had large faces normal to the [100], [110] and [111] direction, referred to the original cubic axes. In each case two slabs, one thick (⅛ inch), and one fairly thin (1/32 inch), were cut. The faces were polished to be approximately plane and parallel. The X-ray examination showed the faces to all be within 3° of the desired orientation. These crystal cuts were then examined in polarized light. The twin boundaries were visible as sets of parallel lines or striations. The slab with [111] face exhibited lines which intersect at about 60°. The [100] and [110] cuts showed sets of parallel lines which are orthogonal. In the [100] cut there were a great many striations indicating that the individual twin "domains" were very small, while the [110] cut was nearly clear throughout. This [110] cut is the most useful for identification purposes and the nearly uniform appearance was probably the result of "cold working" while the slab was being fabricated. These features are all in conformity with transformation twinning on the [100] planes.

Detwinning of the melt-pulled $LaAlO_3$ crystals is readily accomplished by applying at ambient room temperature a moderate stress against faces cut perpendicular to one of the atom displacement directions resulting from the phase transformation during cool down after crystal growth. A compressive stress and the resultant strain favor domain orientations where the optic axis is in or near the direction of the compression. Accordingly the best results in detwinning are obtained when the compressive stresses are applied along one of the [111] directions. For other directions of the applied stress, detwinning can be accomplished but the stress required increases as the direction moves away from the [111] directions. For example, when the longitudinal axis of a melt-pulled boule was found to be approximately in the [211] direction of the crystal lattice, a moderate stress well below that which would cause crystal fracture applied along the boule axis resulted in detwinning even though the [211] direction of the crystal lattice is about 20 degrees from the [111] direction.

The stresses applied substantially along the [111] direction required to produce a noticeable detwinning affect on the crystal occurs at less than 850 p.s.i. For substantially complete detwinning, stress levels below about 2,500 p.s.i. have been found to be effective.

Although the mechanical detwinning of $LaAlO_3$ crystals as described above is an irreversible process, i.e. relief of the applied stress does not cause a return to the twinned condition, we have further found that twins can be reintroduced into a detwinned crystal by the application of a non-axial stress. A simple hand-applied bending stress is suitable. Detwinning of this re-twinned crystal can again be accomplished by an axially applied stress, i.e. effectively along an [111] direction of the crystal lattice.

Using the melt formulations set forth hereinbefore at temperatures of about 2115° C. and a nitrogen atmosphere, "pure" and Eu doped $LaAlO_3$ crystals ranging in diameter from 3/16 inch to 1/2 inch and 1/2 inch to 4 inches in length (~9 to 43 grams mass) were pulled by the Czochralski techniques from melts in iridium crucibles at rates from 1/16 to 1½ inces per hour. There was no visible crucible erosion and no iridium was found in the frozen melt by emission spectroscopy. Seed crystals were grown on an iridium rod and oriented essentially in the [111] direction. All crystals so grown were found to be twinned upon being cooled to room temperature and were readily detwinned by the application of moderate mechanical stress along the [111] direction. The crystals so produced are useful as laser hosts.

What is claimed is:

1. Process for preparing a detwinned, optically transparent single $LaAlO_3$ crystal which comprises pulling a boule of said crystal from a melt composition consisting essentially of (a) substantially equimolar proportions of $La_2O_3$ and $Al_2O_3$, and (b) up to minor amounts of sources of dopant ions, cooling the crystal boule thus formed to ambient room temperature, whereby the crystal undergoes a phase transition with resulting twinning causing the crystal to become optically translucent, and thereafter detwinning said crystal by subjecting same below the temperature of said phase transition to a mechanical compressive stress effective along a [111] direction of the crystal until the crystal exhibits optical transparency.

2. Process for preparing a detwinned, optically transparent single $LaAlO_3$ crystal which comprises pulling a boule of said crystal from a melt composition consisting essentially of substantially equimolar proportions of $La_2O_3$ and $Al_2O_3$, cooling the crystal boule thus formed to ambient room temperature, whereby the crystal undergoes a phase transition with resulting twinning causing the crystal to become optically translucent, and thereafter detwinning said crystal by subjecting same below the temperature of said phase transition to a mechanical compressive stress effective along a [111] direction of the crystal until the crystal exhibits optical transparency.

3. The process of claim 2 wherein said stress is applied at room temperature.

4. Process for preparing a detwinned, optically transparent single $LaAlO_3$ crystal which comprises pulling a boule of said crystal from a melt composition consisting essentially of (a) substantially equimolar proportions of $La_2O_3$ and $Al_2O_3$, and (b) minor amounts of sources of dopant ions, cooling the crystal boule thus formed to ambient room temperature, whereby the crystal undergoes a phase transition with resulting twinning causing the crystal to become optically translucent, and thereafter detwinning said crystal by subjecting same below the temperature of said phase transition to a mechanical compressive stress effective along a [111] direction of the crystal until the crystal exhibits optical transparency.

5. The process of claim 4 wherein said stress is applied at room temperature.

6. Process for producing untwinned, optically transparent single crystals of $LaAlO_3$ having a single homogeneous domain at 25° C. which comprises: subjecting an optically translucent twinned single crystal, prepared by pulling from a melt, of undoped or doped $LaAlO_3$, at a temperature only below the phase transition temperature between the twinned and untwinned forms, to a mechanical compressive stress effective along a [111] direction of the crystal until the crystal exhibits optical transparency.

References Cited
UNITED STATES PATENTS
2,691,738   10/1954   Matthias _____ 252—62.9

OTHER REFERENCES
Forrat et al.: On the Crystallogenesis and Optical Properties of $LaAlO_3$, Comptes Rendus, Feb. 4, 1963, t. 256, pp. 1271–74.

Lawson: Preparation of Single Crystal (1958), pp. 10–14.

Cahn: Advances in Physics, vol. 3, October 1954, pp. 363–66 and 401–405.

OSCAR R. VERTIZ, Primary Examiner

J. COOPER, Assistant Examiner

U.S. Cl. X.R.

23—301 SP, 305; 423—263, 600